US009793983B2

(12) United States Patent
Olesen et al.

(10) Patent No.: US 9,793,983 B2
(45) Date of Patent: *Oct. 17, 2017

(54) MOBILE COMMUNICATION DEVICE AND METHOD FOR ADAPTIVE RF FRONT-END TUNING

(71) Applicant: Intel IP Corporation, Santa Clara, CA (US)

(72) Inventors: Poul Olesen, Stoevring (DK); Peter Bundgaard, Aalborg (DK); Mikael Bergholz Knudsen, Gistrup (DK)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,747

(22) Filed: Jun. 23, 2016

(65) Prior Publication Data
US 2016/0301465 A1 Oct. 13, 2016

Related U.S. Application Data

(63) Continuation of application No. 14/108,965, filed on Dec. 17, 2013, now Pat. No. 9,432,112.

(51) Int. Cl.
H04W 24/00 (2009.01)
H04B 7/26 (2006.01)
(Continued)

(52) U.S. Cl.
CPC ............. H04B 7/265 (2013.01); H04B 1/50 (2013.01); H04B 17/0085 (2013.01);
(Continued)

(58) Field of Classification Search
CPC ...... H04B 7/265; H04B 17/0057; H04B 1/50; H04W 24/08; H04W 88/06
See application file for complete search history.

(56) References Cited

U.S. PATENT DOCUMENTS 4,893,316 A * 1/1990 Janc ..................... H03C 3/40
341/110
6,724,840 B1 * 4/2004 Osofsky ............... H04B 1/1027
330/149
(Continued)

OTHER PUBLICATIONS

"U.S. Appl. No. 14/108,965, Non Final Office Action dated Jan. 4, 2016", 16 pgs.
(Continued)

Primary Examiner — Ricky Ngo
Assistant Examiner — Lan Huong Truong
(74) Attorney, Agent, or Firm — Schwegman Lundberg & Woessner, P.A.

(57) ABSTRACT

Examples of a system and method for adaptively tuning a radio frequency (RF) front-end are generally described herein. In some examples, the frequency of a transmit signal of RF front-end circuitry is swept in at least a part of the RF transmit band. RF power in a receiver is detected as a function of the RF frequency of the transmit signal to determine a location of at least one tunable notch or other band stop element in the frequency domain. Information from the detected RF power is determined as a function of the RF frequency of the transmit signal. The RF front-end circuitry is adjusted to a selected frequency response using the determined information.

30 Claims, 8 Drawing Sheets

(51) Int. Cl.
  *H04B 17/14* (2015.01)
  *H04B 17/21* (2015.01)
  *H04B 1/50* (2006.01)
  *H04B 17/00* (2015.01)
  *H04W 24/08* (2009.01)
  *H04W 88/06* (2009.01)
  *H04B 17/19* (2015.01)
  *H04B 17/318* (2015.01)

(52) U.S. Cl.
  CPC ............ *H04B 17/14* (2015.01); *H04B 17/21* (2015.01); *H04W 24/08* (2013.01); *H04B 17/19* (2015.01); *H04B 17/318* (2015.01); *H04W 88/06* (2013.01)

(56) References Cited

U.S. PATENT DOCUMENTS

| | | | | |
|---|---|---|---|---|
| 7,583,950 | B2 * | 9/2009 | Russell | H03H 7/0115 455/290 |
| 7,876,869 | B1 * | 1/2011 | Gupta | H04B 1/109 375/350 |
| 8,204,446 | B2 * | 6/2012 | Scheer | H01Q 1/242 455/129 |
| 8,385,483 | B2 * | 2/2013 | Abdelmonem | H04B 1/1036 375/148 |
| 2008/0075149 | A1 * | 3/2008 | Botha | H04B 1/70735 375/148 |
| 2008/0137772 | A1 * | 6/2008 | Behzad | H03F 1/3247 375/296 |
| 2010/0233975 | A1 * | 9/2010 | Wu | H04W 52/52 455/115.1 |
| 2011/0051782 | A1 * | 3/2011 | Gupta | H03H 11/12 375/140 |
| 2011/0149773 | A1 * | 6/2011 | Lee | H03G 3/3078 370/252 |
| 2012/0183031 | A1 * | 7/2012 | Kolze | H04B 1/10 375/224 |
| 2012/0243447 | A1 * | 9/2012 | Weissman | H04B 1/0458 370/280 |
| 2013/0016798 | A1 * | 1/2013 | Velazquez | H04B 1/001 375/340 |
| 2014/0176482 | A1 | 6/2014 | Wei et al. | |
| 2015/0171955 | A1 | 6/2015 | Olesen et al. | |
| 2017/0176482 | A1 * | 6/2017 | Fujii | G01N 35/025 |

OTHER PUBLICATIONS

"U.S. Appl. No. 14/108,965, Notice of Allowance dated Apr. 29, 2016", 13 pgs.

"U.S. Appl. No. 14/108,965, Response filed Mar. 29, 2016 to Non Final Office Action dated Jan. 4, 2016", 14 pgs.

* cited by examiner

MOBILE COMMUNICATION DEVICE AND METHOD FOR ADAPTIVE RF FRONT-END TUNING

This application is a continuation of and claims priority to U.S. patent application Ser. No. 14/108,965 filed Dec. 17, 2013, now issued as U.S. Pat. No. 9,432,112, and entitled "MOBILE COMMUNICATION DEVICE AND METHOD FOR ADAPTIVE RF FRONT-END TUNING," which is incorporated herein by reference in its entirety.

BACKGROUND

Modern mobile handsets or so called Smart-phones are not just capable of communicating over a wide range of radio frequencies and of supporting various wireless technologies. They also include a range of peripheral devices like camera, keyboard, larger display, flashlight etc. The provision to support such a large feature set in a limited size, constraints the designers of radio frequency (RF) front ends to make compromises in the design and placement of the antenna which deteriorates its performance. The surroundings of the antenna especially when it comes in contact with human body, adds to the degradation in its performance. The main reason for the degraded performance is the mismatch of impedance between the antenna and the radio transceiver which causes part of the transmitted power to be reflected back.

An antenna is connected through an RF front-end module (FEM) to the transceiver (TRx) to provide a bi-directional wireless RF link. Information is passed between the user and base-band controller via various user interfaces, like keypads, microphone, loudspeaker and display. The baseband controller processes received data as well as data that needs to be transmitted and maintains synchronized connection to the cellular network. More specifically, the baseband controller modulates data packets for transmission and demodulates IF signals when received. The RF front-end module connects the antenna to selected transmitter (Tx) and receiver (Rx) signal paths that are frequency-band selective in order to minimize spurious emission and reception. The complexity of these front-end modules increases steadily because the number of mobile phone frequency-bands and communication standards keeps on getting larger leading to higher RF front-end loss and thus increased power consumption and poor sensitivity However, RF front-end performance may suffer from changes in the operating environment that are often unpredictable. Thus, by tuning a set of parameters, the analog front-end may support a given communication mode.

Tunable front end topologies been proposed and discussed for future generations of mobile terminals. However, the tuning of reactive band stop filter structures in the RF front-end has not been needed until now. The use of many parallel RF chains with fixed filters and antennas supports the large and increasing number of bands and standards. Traditional architectures lead to the use of a large number of different power amplifiers (PAs), switches, filters and low noise amplifiers (LNAs). This makes it difficult to reduce the area used for the RF solution in order to achieve attractive form factors for the market. Future capabilities calls for support for even more bands leading to an even more complex RF front-end.

The antenna match may be adaptively tuned using various tuning methods and circuitry, as implied above. However, such circuitry and methods cannot be used to tune the stop band part of the front end circuitry because the return loss, by nature, is very high in the part of the spectrum where band stop elements are located.

DETAILED DESCRIPTION

Examples described herein provide a method for adaptively tuning an RF front-end. The front-end circuitry is swept in the part of the RF spectrum relevant for duplex operation of the system, and the detected RF power is used as a function of RF frequency in the receiver to determine the location of one or more tunable notches or other band stop elements in the frequency domain. This is done by a relative wide band sweep of the frequency spectrum relevant for the transmit (TX) circuitry while the receiver is measuring the same signal at the same time. The mobile terminal is functioning as its own, scalar network analyzer because it is providing RF stimuli to itself and uses its own receiver to detect the transmitted signal. Information about the measured frequency response of the front-end structures is determined in this way, and used to adjust the front-end circuitry to a selected frequency response. Inter-stage transmit and receive filters or filter/antenna combinations are adjusted in the same way.

Figure 1:
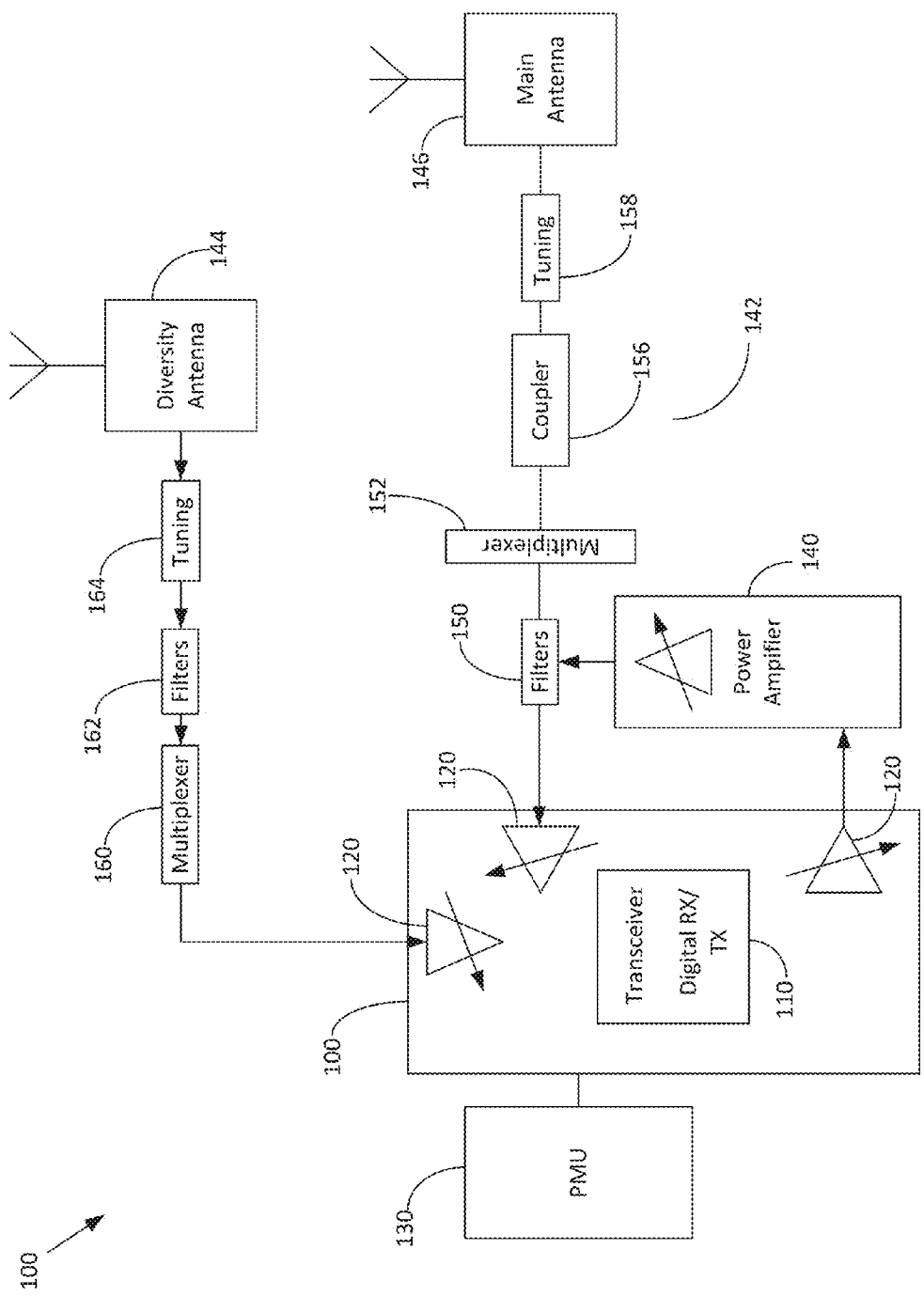
FIG. 1 illustrates an RF front-end block diagram according to an example.

FIG. 1 illustrates an RF front-end block diagram 100 according to an example. In FIG. 1, a transceiver 110 processes signals to and from an intermediate frequency stage (not shown), or IQ signals. The transceiver 110 may include amplifiers 120 for signal conditioning. A power management unit 130 is coupled to the transceiver 110 for controlling the use of power. A power amplifier 140 connects the main antenna 146 to selected transmitter (Tx) and receiver (Rx) signal paths 142 that are frequency-band selective in order to minimize spurious emission and reception. A diversity antenna 144 provides samples of data from a RF path which is uncorrelated to the RF signal received b the main antenna. The transceiver 110 then will perform switched diversity, i.e., choose the receive signal with the most energy, or combined diversity, i.e., sum the powers from two receiving antennas, including main antenna 146. The main antenna 146 is coupled to the transceiver 110 via filter 150, multiplexer 152, coupler 156, and antenna tuning module 158. The diversity antenna 144 is coupled to the transceiver 110 via a multiplexer 160, filters 162 and antenna tuning module 164. While FIG. 1 shows one signal line from filter 150 to multiplexer 152, for example, those skilled in the art will recognize that many signal lines may be provided as suggested by multiplexers 152, 160.

Figure 2:
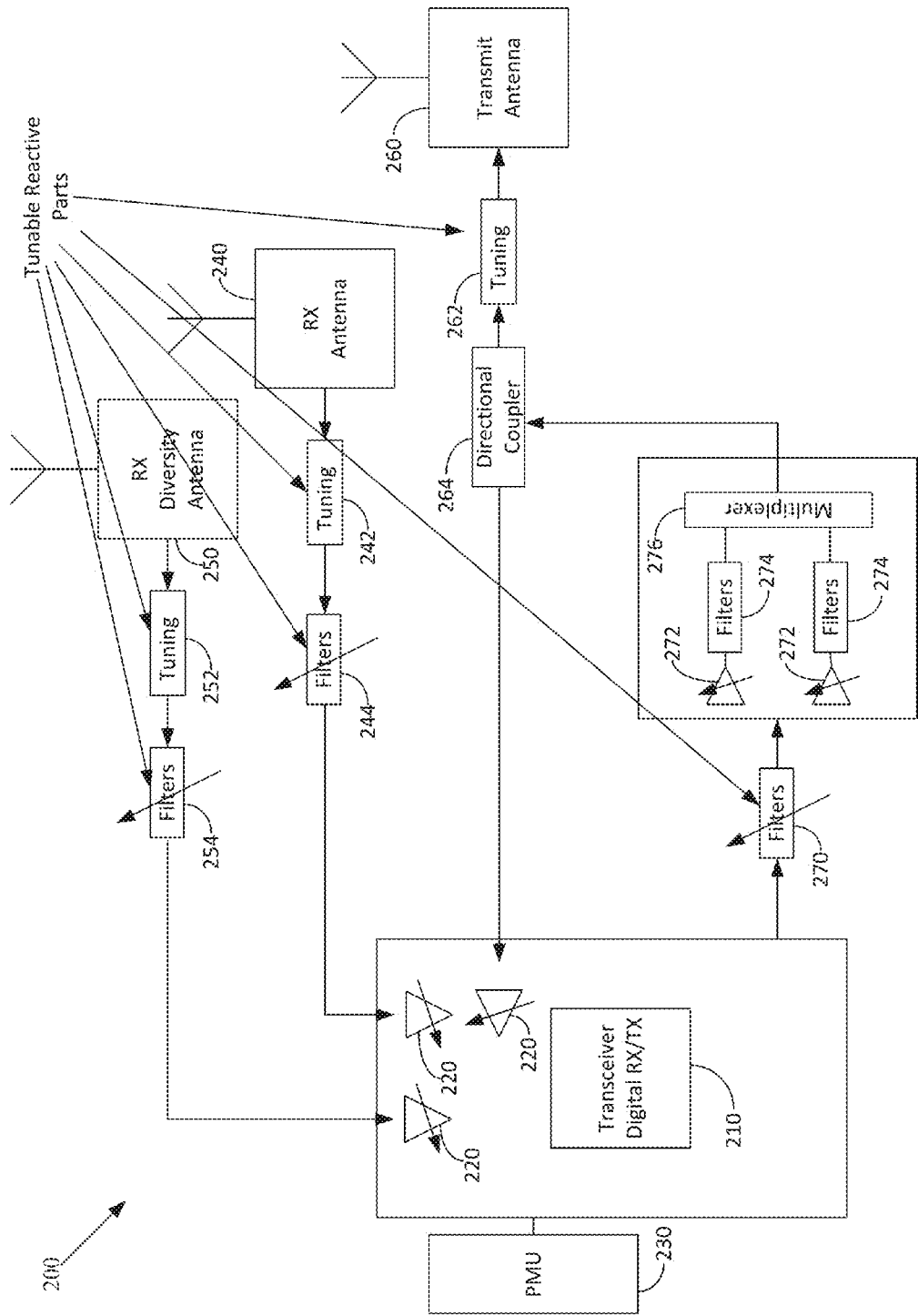
FIG. 2 illustrates an alternative RF front-end according to an example.

FIG. 2 illustrates an alternative RF front-end 200 according to an example. In FIG. 2, a transceiver 210 processes signals to and from an intermediate frequency stage (not shown). The transceiver 210 may include amplifiers 220 for signal conditioning. A power management unit 230 is coupled to the transceiver 210 for controlling the use of power. FIG. 2 shows a receive antenna 240, a receive diversity antenna 250 and a TX antenna 260. The receive antenna 240 is coupled to transceiver 210 through a tuning module 242 and a tunable filter 244. The tuning module 242 may be used to fine tune the impedance/frequency characteristics of the transmit/receive paths, in this case, the receive path, by adjusting active elements, for example, to adjusting modes of receive antenna 240. The tunable filter 244 is designed to dynamically filter signals over a given bandwidth at any given wavelength over a given operating range to set a center frequency and bandwidth for the channel, in this case the receive path.

The receive diversity antenna 250 is coupled to transceiver 210 through a tuning module 252 and a tunable filter 254, The TX 260 is coupled to transceiver 210 through a tuning module 262 and a directional coupler 264. Tunable filters 270, tunable amplifiers 272, filters 274 and multiplexer 276 provide transmit signal to directional coupler 264. Those skilled in the art will recognize that an RF switch may be substituted for multiplexor 276.

Figure 3:
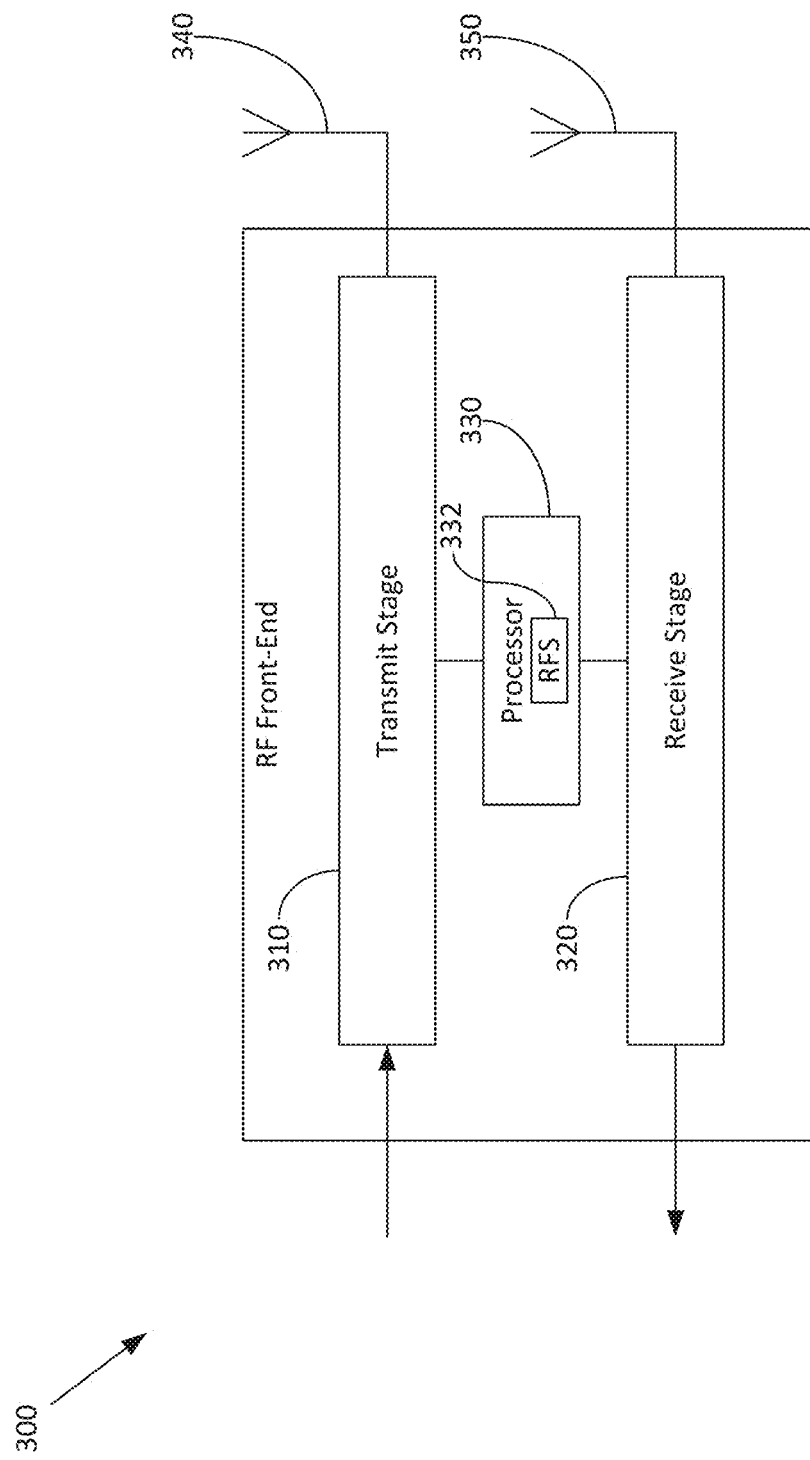
FIG. 3 illustrates an RF front-end according to an example.

FIG. 3 illustrates an RF front-end 300 according to an example. The RF front-end includes a transmit stage 310 and a receive stage 320. A processor 330 is provided to control the tuning method, The transmit stage 310 provides a transmit signal to the transmit antenna 340 and the receive stage 320 receives a receive signal from the receive antenna 350. According to an example, the tuning method executes in a processor 330, such as a microcontroller, wherein the processor 330 sweeps the frequency of a transmit signal of the RF front-end 300 in at least a part of the RF transmit band and receive band, detects RF power in a receive stage 320 as a function of the RF frequency of the transmit signal from the transmit stage 310 to determine a location of at least one tunable notch or other band stop element in the frequency domain, determines information from the detected RF power as a function of the RF frequency of the transmit signal and adjusts the RF front-end 300 to a selected frequency response using the determined information. For example, the information may include modulation and encoded/encrypted information. The processor 330 executes high level commands and interface control commands that are not handled directly in the hardware. The commands are either executed directly or may be prepared for an RF Sequencer (RFS) 332 for the command execution. An RF Sequencer 332 is a simple processor that allows simple programs with sequences and branches and may or may not be part of the main processor 330.

This tuning method executed by processor 330 enables the RF front-end 300 to be tuned to have a level of attenuation of TX noise in the receive band to provide good receive sensitivity. In a similar way, the receive filters and/or the antenna elements are tuned by sweeping the transmit and receive part of the spectrum, as well as the spectrum adjacent to the transmit band and receive band, and thereby achieve the isolation of TX signal from the transmit stage 310 at the input of the receive stage 320. Production tuning processes may obviously be applied to inter-stage filters in the receive chain, and/or the transmit chain as such circuitry is less sensitive, if sensitive at all, to radiated effects. However the proposed tuning process and method may be used for production tuning of such filter elements as well. A simple tuning or filter setting or pure antenna tuning may be used when the RF front-end 300 is in idle (e.g., receive only, time division duplex (TDD), time division multiple access (TDMA)), as there is no need for duplex isolation when the transmit stage 310 is not turned on. This depends strongly on the hardware architecture and implementation.

Figure 4:
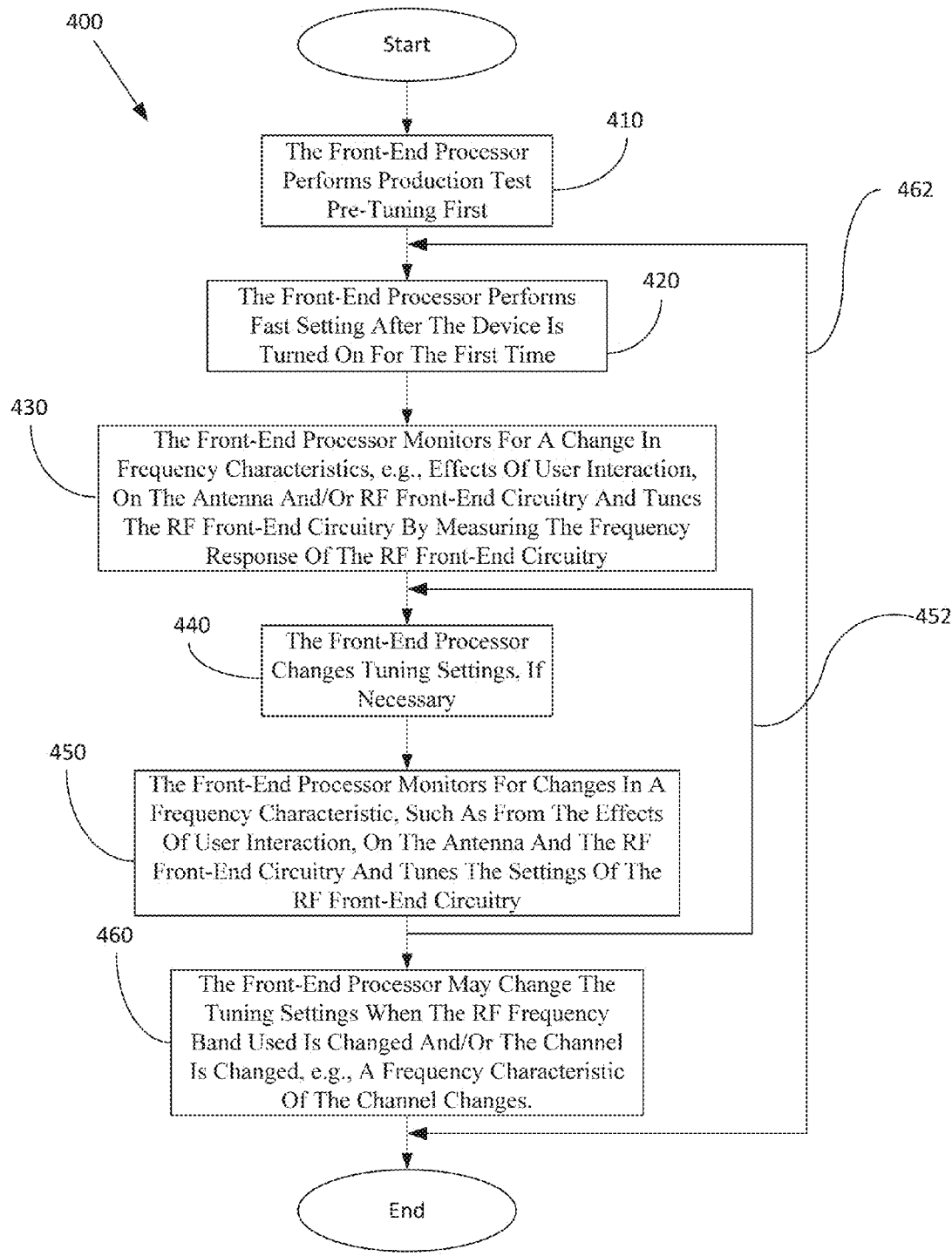
FIG. 4 illustrates a tuning process during production and during use according to an example.

FIG. 4 illustrates a tuning process 400 performed by a front-end processor according to an example. The front-end processor performs production test pre-tuning first 410. The default RF front-end tuning is set by the processor when a no frequency characteristic change is detected, e.g., no hand and head of a user is present or near the RF front-end. For hardware/antenna implementations, where there is no or limited effects on the stop band performance (location of band stop elements) caused by, for example, the hand/head of the user being near the RF front end, no other steps are used. Traditional production equipment, RF signal sources and spectrum analyzer or similar, may also be used to provide stimuli or to characterize RF front-end. However the tuning method described here may also be used as a self-test system with purpose of detecting assembly mistakes, as the device is providing its own stimuli. The front-end processor performs fast setting after the device is turned on for the first time 420. Default tune settings determined in production may be used. The RF front-end circuitry may be adapted and optimized for the bands supported by the SIM/operator/country and WWI RFP within reach.

Next, the front-end processor monitors for a change in frequency characteristics, e.g., effects of user interaction, on the antenna and/or RF front-end circuitry and tunes the RF front-end circuitry by measuring the frequency response of the RF front-end circuitry 430, However, examples are not meant to be limited to monitoring effects of user interaction on the frequency response of the RF front-end circuitry 430. Next, the front-end processor changes tuning settings, if necessary 440. The front-end processor monitors for changes in a frequency characteristic, such as from the effects of user interaction, on the antenna and the RF front-end circuitry and tunes the settings of the RF front-end circuitry 450. The front-end processor may repeat 452 the changing of the tuning settings 440. The front-end processor may change the tuning settings when the RF frequency band used is changed and/or the channel is changed 460, e.g., a frequency characteristic of the channel changes. In this case, the front-end processor may repeat 462 the monitoring the changes in frequency characteristics on the antenna and/or the turning of the RF front-end circuitry by measuring the frequency response of the RF front-end circuitry 430. However, those skilled in the art will recognize that other means of proximity sensing may be used to predict frequency response and to adjust accordingly. For example, such effects may be known by design or test and used to ease the adjusting of the tune settings.

The challenge in this implementation is to make the system acceptable from an RF emission point of view and to not distort operation of the mobile terminal. RF emission targets for mobile terminals are written with the aim to not distort other users of the RF spectrum in use case scenarios (e.g., located 1-2 m apart). Accordingly, power levels below this threshold with some margin but still high enough to have dynamic range enough to measure the frequency response of the front end circuitry are used. The RF tuning needs to be active in use case scenarios.

Figure 5:
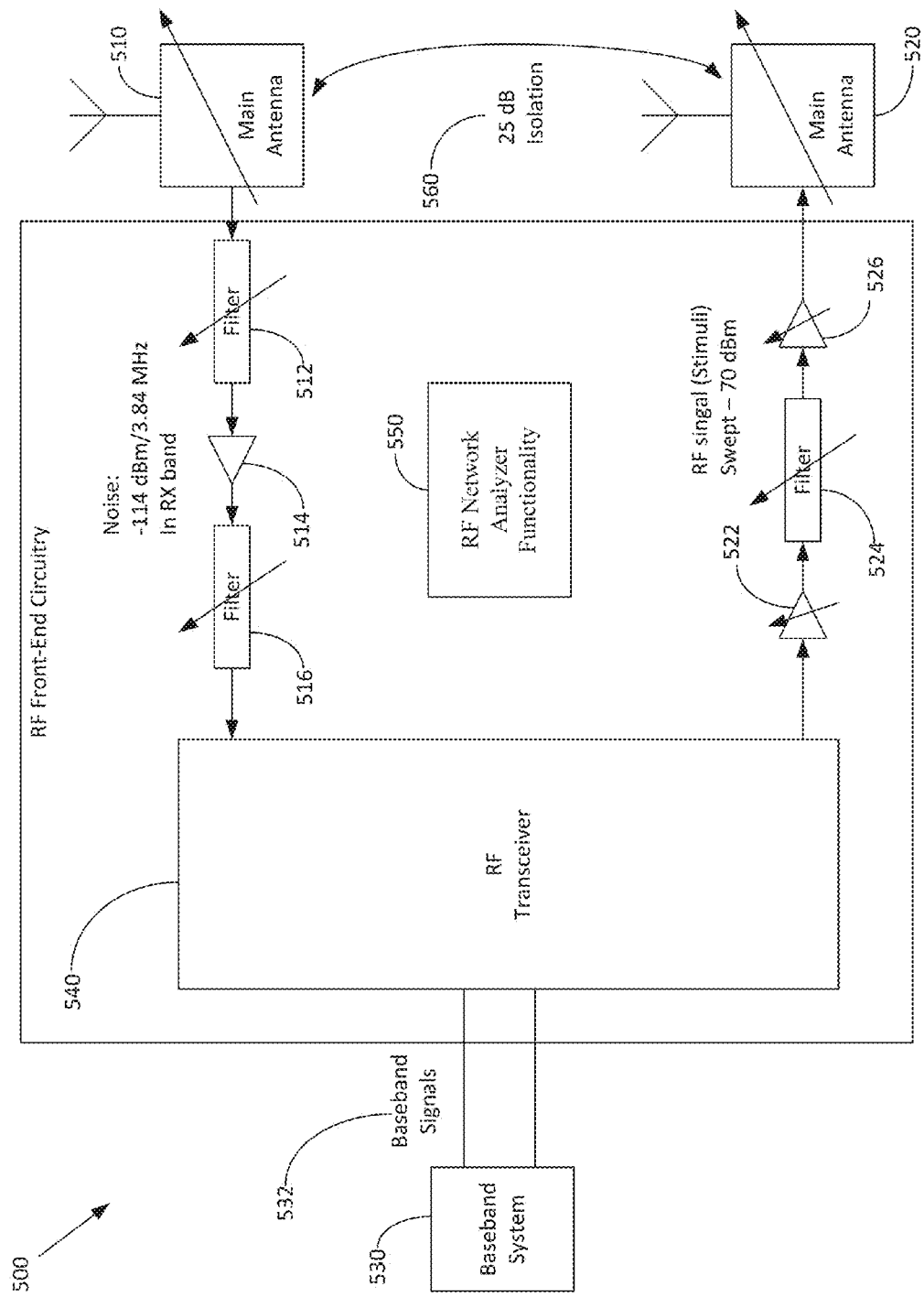
FIG. 5 is a detailed block diagram of RF front-end circuitry according to an example.

FIG. 5 is a detailed block diagram of RF front-end circuitry 500 according to an example. The RF front end 500 is generally defined as everything between the antennas 510, 520 and the digital baseband system 530. This area includes, on the receive side, the filters 512, 516, low-noise amplifiers (LNAs) 514, used to process the modulated RF signals received at antenna 510 into baseband signals 532. On the transmit side, the RF front-end 500 includes low power amplifiers 522, 526 and filter 524 that are used to filter and amplify the modulated RF carrier generated in the transceiver to the required RF power level before being fed into the antenna 520. The RF transceiver 540 provides the interfaces between the baseband system 530 and RF front-end components described above. However, those skilled in the art will recognize that examples of RF front-end circuitry 500 are not meant to be limited to the components and arrangement shown in FIG. 1. RF front-end circuitry 500 according to examples may include other arrangements and components in accordance with the teachings described herein. For example, the RF front-end circuitry 500 may include couplers, impedance matching modules, etc. and the arrangement of the components may be altered, e.g., filters may be disposed before and after amplifiers and amplifiers may be disposed before and after filters. Furthermore, RF front-end circuitry 500 according to an example may be implemented in hardware, software or a combination of hardware and software.

Functionality of a scalar RF network analyzer 550 is implement between the receive antenna 510 and the transmit antenna 520 as well as in the RF front-end circuitry 500. This may be integrated in the hardware and software as an integral part of the system for operation of the mobile terminal. Scalar RF network analyzer functionality 550 is used to adaptively tune the RF front-end circuitry 500, including the antennas 510, 520. The frequency response of the RF front-end circuitry 500 may thus be tuned and optimized for best performance at any time.

Scalar RF network analyzer functionality 550 may be used to adapt the RF front-end circuitry 500 to different frequency bands in production and/or in operation. Potential pre-tuning in production may be performed without use of expensive RF test equipment. Detuning due to effects of user interaction such as load pulling caused by hand/head effects, temperature drift, component tolerances and other similar effects may also be accounted for. This also includes effects caused by metal or other items in the environment that has an influence on the functionality of any reactive RF circuitry elements in the RF front-end including the antenna. The RF front-end circuitry 500 may be adapted by the scalar RF network analyzer functionality 550 for load pulling effects that affect the performance of filters or matching components. In addition, the Scalar RF network analyzer functionality 550 may be used to reduce the effective duplex spacing, as tuning enables larger effective duplex spacing for the filters 512, 516, 524 compared with current solutions where fixed filters are used. This tuning allows larger effective duplex spacing as the RX/TX bands do not need to be covered simultaneously.

The RF front-end circuitry 500 transmits RF energy into the air in an uncontrolled way as far as the network planning and use of the frequency band is concerned. This may be illegal to do from an RF emission point of view. Thus, RF energy is transmitted in the receive band to do the tuning. The emissions targets in the receive bands are very stringent for any mobile system. It is not possible to transmit any RF signal that reduces the sensitivity of the receiver in the mobile terminal itself. Implementation of a tuning method for systems operating with 100% duty cycle and in full duplex operation (Third Generation (3G) Universal Mobile Telecommunications System (UMTS) Long Term Evolution (LTE)) is a major challenge because there are no time slots available for RF tuning during for certain use cases. In contrast, for RF systems operating in time division duplex (TDD) or time division multiple access (TDMA) mode, tuning may be performed in vacant timeslots for many use cases and the system is, for this reason, much easier to design than for full duplex systems like UMTS/3G and LTE. RF power levels are thus controlled to satisfy third generation partnership project (3GPP) specifications, as well as from a practical point of view. The RF power levels are defined as effective isotropic radiated power (EIRP) as emitted by the transmit antenna 520 or as measured into a 50 ohm load at the output of the power amplifier 526.

There are several issues involved in meeting certain power level goals. Receiver sensitivity will be degraded by any signal transmitted in the receive band. This is not only a potential problem for the mobile terminal itself, but also for mobile devices near the mobile terminal that may be using the same frequency bands. The sensitivity has been set to −114 dBm/3.84 MHz in transmit level plans. Thus, any RF "in band" RF signal used for tuning the RF front-end 500 that is above −114 dBm at the receive input is a potential problem within the bandwidth of the used channel. Other bands are subject to co-existing goals, e.g. −50 dBm/1 MHz as indicated in 3GPP TS36.101 V8.13.1;1. GSM goals for transmit power in the receive band are −79 dBm/100 kHz. Power level is set in such a way that the transceiver 540 in a handset does not disturb the receiver performance of a handset which is located about 1 m away. Separation of one meter of the front-end circuitry may result in 30-60 dB attenuation and the maximum potential co-channel power level any receiver will be affected by will be near −110 dBm, which is near the sensitivity threshold of a typical GSM receiver. To provide a good margin, a signal of −90 dBm may be sent.

When the RX channel in use is omitted in a tuning process and only adjacent channels are used, the maximum RF power level that may be used is limited by the adjacent channel selectivity performance of the system, which may be −40 dBm for a worst case scenario for 20 MHz bandwidth. A lowest sensitivity reference sensitivity power level (REFSENS) level may be −106 dBm. This sets a natural limit to the lowest absolute RF power level that may easily be measured or detected by the transceiver 540. The sensitivity performance of the receiver is 5 to 10 dB better than suggested by 3GPP in order to provide margin as well as to provide a good quality of service for the end users.

Minimum output power may he adjusted dynamically between −40 dBm and 23 dBm for LTE, and for 3G/UMTS between −50 dBm to 23 dBm. At very low transmit RF output power, filtering by the RF front-end 500 is relaxed compared with the maximum RF output power levels. The toughest filter constraints for the RF front-end 500 are set by third order products between blocking signals and the transmit signal itself in the low noise amplifier (LNA)/mixer combination, as well as second order product when the transmit signal is mixed in the LNA/mixer. This enables use of relaxed and less complicated tuning algorithms at low RF output power. When the transmitter is off is the maximum allowed RF output power may be −50 dBm.

Allowed power levels inside the transmit band and near the transmit channel in use is determined by adjacent channel leakage ratio (ACLR) interference characteristics. The lowest absolute RF power emission due to ACLR and spectrum emission recommendations may be −50 dBm. An RF power level of −50 dBm may be the highest level that may be used according to the list above. To have good margins, the level may not be higher than −60 dBm. This allow for 46 dB dynamic range in the measurement due to the sensitivity performance of −106 dBm. This is enough to tune antennas 510, 520 as the isolation target for the antennas is 25 dB.

In a low noise transmit architecture, filter 524 is inserted before the last stage in the power amplifier 526. This inter-stage filter 524 suppress RF signals in the receive band at the input of the last stage in the power amplifier 526. RF noise in the receive band is caused by one of; or a combination of the following: the noise figure in the gain stages in the transmit chain, the thermal noise floor and noise generated by the voltage controlled oscillator (VCO) and phase-locked loop (PLL) circuitry in the transceiver 540. The transmit inter-stage filter 524 therefore ideally needs to be bypassed or tuned for pass band in the receive band while measuring and tuning the transmit antenna 520 in the receive band, in case filter elements (hand stop or band pass elements) with high isolation are implemented in the transmit antenna 520. This is obviously applicable where the combined possible isolation in the inter-stage filter 524 and the transmit antenna 520 is more than 46 dB.

The use of levels between −70 dBm and −60 dBm are well below the level of −50 dBm for coexistence with other bands. The isolation target for antenna 510 is 25 dB as calculated in the smart antenna front end (SAFE) project. The tuning system therefore determines if the absolute RF power detected by antenna 510 is below −95 dBm. The reference sensitivity power level (REFSENS) documents call for 1.4 MHz bandwidth between −101.7 dBm and −106.2 dBm. When the detected RF power is below −95 dBm in the first adjacent channels above and below the used channel, antenna 510 is tuned correctly.

As the dynamic range of the receiver is not sufficient to cope with the combined stop band attenuation or isolation of the 3 filters 512, 516, 524 and the 2 antennas 510, 520, the order for the tuning is a factor to consider. Receive and transmit inter-stage filters 512, 516, 524 may easily be tuned in a production environment by applying external RF signals from measurement equipment and for the transmit case by use of a spectrum analyzer or a system tester. However this may also be achieved without the use of any external test equipment by directly connecting the ports of the receive antenna 510 and transmit antenna 520 together. This may be accomplished by using an RF switch built into the mobile terminal itself or by use of a simple external coax connection between TX antenna port and RX antenna port that can be used in the production environment or for service and repair. In this way, more dynamic range is provided for the measurement. The transmit circuitry in the mobile terminals may, for this purpose, be used as the RF source when sweeping the RF front-end circuitry 500 including the receive parts.

When measuring and thus determining the frequency response of the first receive filter 512 and the two antennas 510, 520, the transmit and receive inter-stage filter 524 is tuned such that the pass band of the filters track the frequency of the transmit signal being used to sweep the remaining part of the front-end circuitry.

Transmit isolation is not applicable in idle mode, TDD mode or TDMA mode. Accordingly, band stop elements that provide transmit isolation may be turned off or moved in the frequency domain to improve insertion loss. Filter insertion loss is often limited by band stop elements in the filter and their loading of the filter. This effect is reduced in case the band stop elements are moved in the frequency domain away from the pass band.

The need for receive linearity, as well as the need for suppression of transmit noise in the receiver band, scales with the absolute RF output power. The RF front-end filtering may therefore be adapted to provide lower insertion loss when at low RF output power and better sensitivity may be achieved for the same reasons as described above. With the software and hardware means described here it is possible to adapt the filtering of the RF front-end 500 to suppress unwanted interference (RF blockers) and suppress de-sensitization caused b RF blockers.

Reduction or RF front-end insertion loss in transmit or receive chains may be translated into lower power consumption and/or increased bandwidth for the RF system if properly utilized by the rest of the system including baseband and software. The transceiver 540 may be made to support this idea by adding or adapting software and firmware, However, where simultaneous use of full duplex operation is called for, MIMO (multiple input, multiple output) and carrier aggregation may be supported.

A receiver is expected to have better sensitivity than the targets set by a mobile communication standard, such as the LTE specification 3GPP TS 36.191 v8.13.1 (2011-04). This means that such system is possible to design as long as the antenna/duplex isolation target is limited to about 25 dB 560. However, if the real sensitivity is much lower, the tuning system according to an example may support higher isolation targets. The sensitivity and thus the dynamic range may be improved by using lower channel bandwidth that is much lower than the bandwidth of the system. The disadvantage of this is obviously speed because the measurement time needs to be longer. Tuning of the RF front-end 500 may be designed as an integral part of the channel monitoring method to support the system.

Dynamic range of this tuning system may be enhanced by modifying or tuning to a low insertion loss of the transmit and receive filters 512, 516, 522 for the purpose of measuring and tuning band stop parts of other filters/components. For the measurement, the change characteristics, e.g., of the duplexer and directional antenna characteristic, receive as much energy coupled from the transmit side to the receive side (bypass/detune duplex filters, circulators, filters etc.). Appropriate settings for operation may be reverted to, wherein explicit coupling elements are activated or shielding/filtering elements between transmit antenna 520 and the receive antenna 510 are de-activated.

The update rate has to be fast enough to cope with user intervention. For example, an estimation for the update rate is for it to be between 100 milliseconds (ms) and 500 ms. In idle mode, or other modes where the mobile terminal is not enabling the transmitter, a much simpler tuning method may be applied because only the RX chain is in use. The toughest front-end filtering goals are dictated by blocking parameters and two tone intermodulation products between the transmit signal and an external blocker. However, it may be possible to avoid RF tuning outside the production and service environment depending on the hardware/antenna configuration and design.

Figure 6:
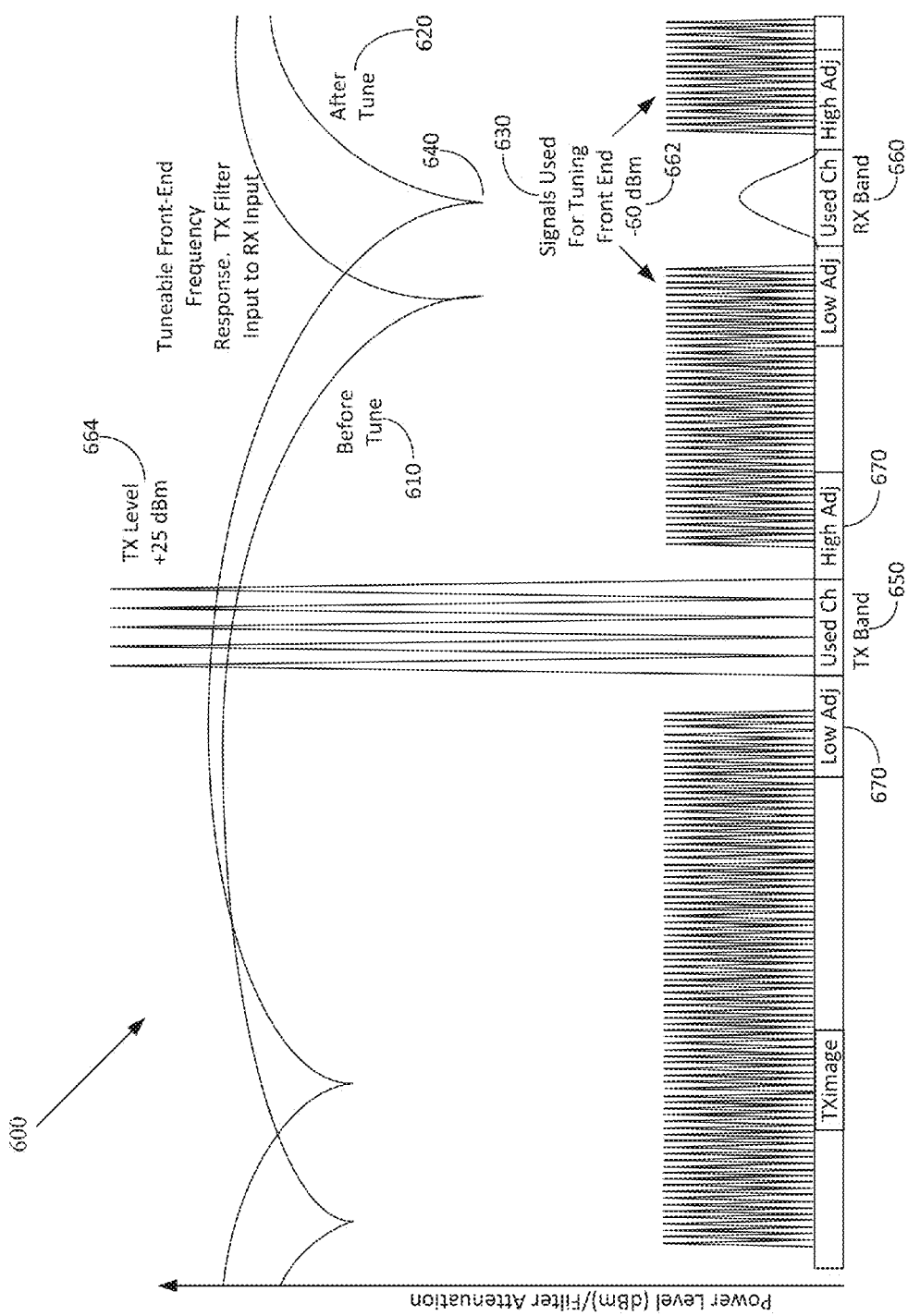
FIG. 6 illustrates power levels and frequency responses for tuning an RF front-end according to an example.

FIG. 6 illustrates power levels and frequency responses 600 for tuning an RF front-end according to an example. FIG. 6 shows the tunable RF front-end frequency response transmit filter input to receive filter output according to an example before tuning 610 and after tuning 620. A complete sweep of the tuning signals 630 across the possible bandwidth of the band stop filter may be made for initial tuning.

Location of a notch 640 or tuning of any band stop filter responses measured in the frequency domain may be located in this way and filter may be tuned accordingly. FIG. 6 also shows the used channel transmit band 650 and the used channel receive band 660. Signals used for tuning 630 the RF front-end may be −60 dBm 662, whereas the transmit power level may be for example +25 dBm 664. The signals used for tuning 630 may be swept through the transmit part of the spectrum 650, as well as the adjacent spectrum 670.

The orthogonal frequency division multiplexing (OFDM) modulation scheme used for LTE makes use of sub-carriers in a bandwidth up to 100 MHz. Thus, the full band may be transmitted/tuned at once, as adjacent channels for other bands may be transmitted/covered simultaneously. The RF stimuli may potentially be provided inherently as part of the transmit signal 650 in case the modulator has sufficiently large bandwidth.

As the transmission of RF energy happens in the radiated field in the antenna system, RF signals from base stations and/or other RF sources may disturb this tuning process and potentially fool the method. For this reason, the RF signal used for the tuning 630 includes information to be received and decoded in the receiver that identifies that the RF energy detected is from the handset's own transmitter. Use of a narrow band signal and a matching narrow band receive filter for this tuning process also helps reduce the possibility of any collisions.

The RF spectrum for this tuning algorithm may also use system/protocol information to predict when there are free RF channels (Long Term Evolution (LTE) sub carriers) or time slots available. If this is done correctly and carefully, the tuning signals 630 may be used when there are no disturbances from the system. Another option is to use frequency spectrum very close to the edge of the band, e.g., adjacent spectrum 670 just inside or outside the used frequency bands 650, 660.

Figure 7:
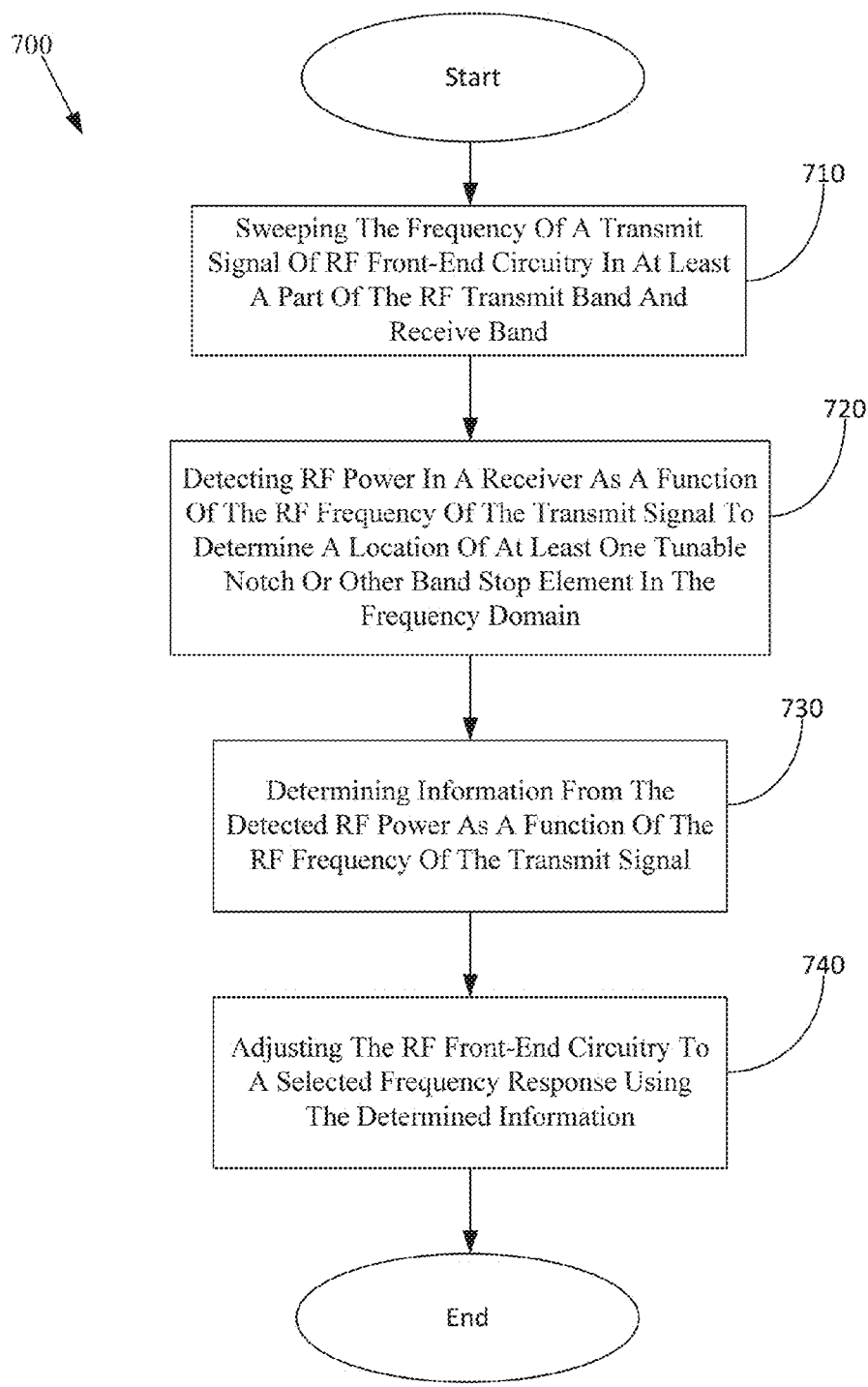
FIG. 7 is a flow chart of a method for adaptively tuning a radio frequency (RF) front-end according to an example.

FIG. 7 is a flow chart of a method 700 for adaptively tuning a radio frequency (RF) front-end according to an example. The frequency of a transmit signal of RF front-end circuitry is swept in at least a part of the RF transmit band and receive band 710. RF power in a receiver is detected as a function of the RF frequency of the transmit signal to determine a location of at least one tunable notch or other band stop element in the frequency domain 720. Information from the detected RF power is determined as a function of the RF frequency of the transmit signal 730. The RF front-end circuitry is adjusted to a selected frequency response using the determined information 740. For example, the information in the transmit signal may include modulation and encoded/encrypted information.

Figure 8:
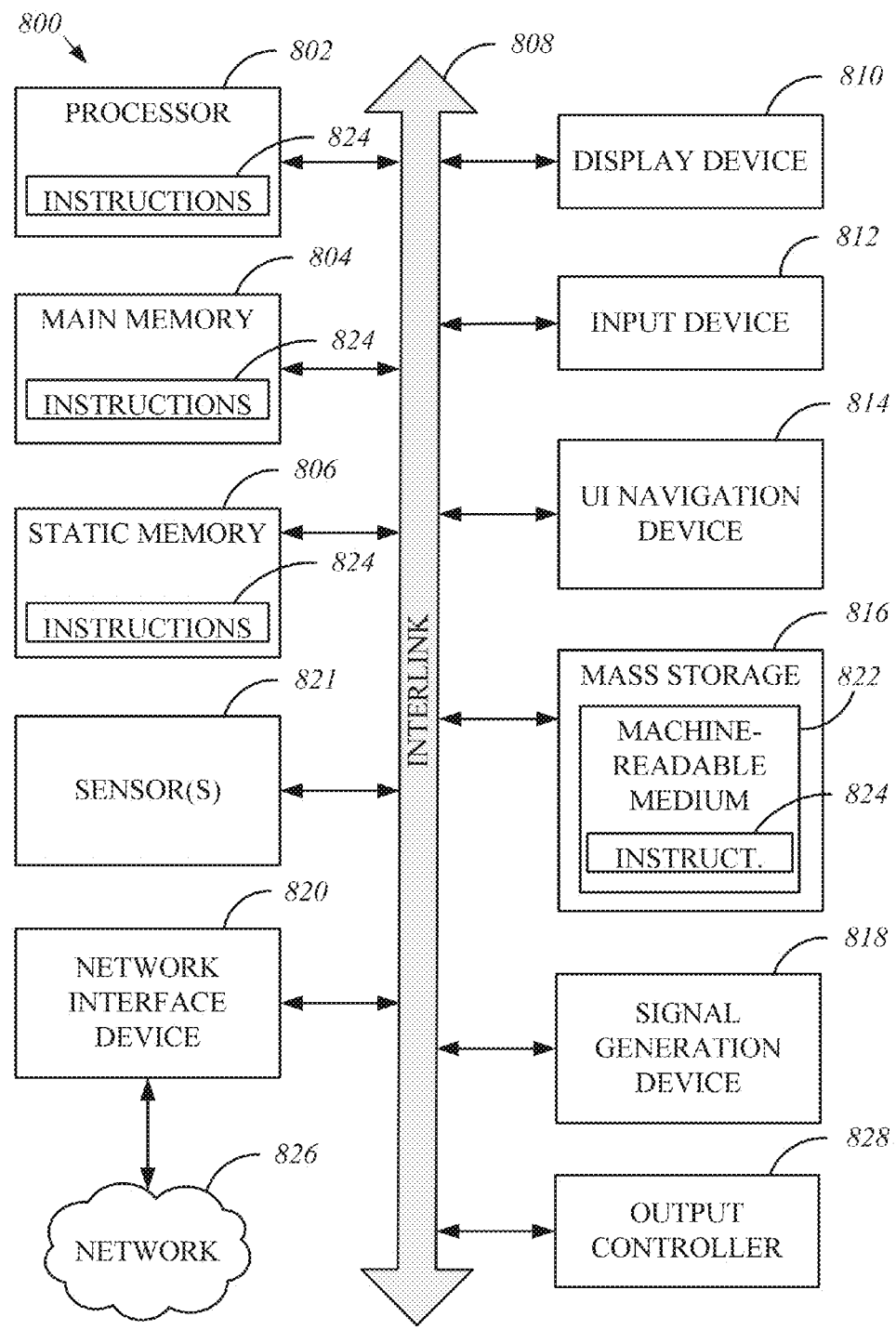
FIG. 8 illustrates a block diagram of an example machine for adaptively tuning a radio frequency (RF) front-end according to an example.

FIG. 8 illustrates a block diagram of an example machine 800 for adaptively tuning a radio frequency (RF) front-end according to an example upon which any one or more of the techniques (e.g., methodologies) discussed herein may perform. In alternative examples, the machine 800 may operate as a standalone device or may he connected (e.g., networked) to other machines. In a networked deployment, the machine 800 may operate in the capacity of a server machine and/or a client machine in server-client network environments. In an example, the machine 800 may act as a peer machine in peer-to-peer (P2P) (or other distributed) network environment. The machine 800 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be configured (e.g., internally or with respect to external entities such as other circuits) in a specified manner as a module. In an example, at least a part of one or more computer systems (e.g., a standalone, client or server computer system) or one or more hardware processors 802 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 802 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof and the like. Thus, the term application may be used to refer to an example of software or to hardware configured to perform at least part of any operation described herein.

Machine (e.g., computer system) 800 may include a hardware processor 802 (e.g., a central processing unit (CPU), a graphics processing unit (GPU), a hardware processor core, or any combination thereof), a main memory 804 and a static memory 806, at least some of which may communicate with others via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The storage device 816 may include at least one machine readable medium 822 on which is stored one or more sets of data structures or instructions 824 (e.g., software) embodying or utilized by any one or more of the techniques or functions described herein. The instructions 824 may also reside, at least partially, additional machine readable memories such as main memory 804, static memory 806, or within the hardware processor 802 during execution thereof by e machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) that configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (Wifi), IEEE 802.16 standards (WiMax®) and others), peer-to-peer (P2P) networks, or other protocols now known or later developed.

For example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes & in Examples

Example 1 includes subject matte such as a method or means for performing acts) for adaptively tuning an RF front-end, including sweeping an RF frequency of a transmit signal of the RF front-end circuitry in at least a part of an RF transmit band and receive band, detecting RF power in a receiver as a function of the RF frequency of the transmit signal to determine a frequency characteristic of the transmit signal, determining information from a detected RF power as a function of the RF frequency of the transmit signal and adjusting the RF front-end circuitry to a selected frequency response using the determined information.

In Example 2 the subject matter of Example 1 may optionally include, sweeping the frequency of the transmit signal in a spectrum adjacent to the transmit band when the transmit signal is isolated at the input of the receiver, and using information in the transmit signal of a transmitter of the RF front-end circuitry to identify that the RIF energy detected at a receiver of the RF front-end circuitry originates from the transmitter of the RF front-end circuitry.

In Example 3 the subject matter of any one or more of Examples 1-2 may optionally include, sweeping the frequency of the transmit signal of the RF front-end circuitry during a production test pre-tuning when no hand and head of a user is present.

In Example 4 the subject matter of any one or more of Examples 1-3 may optionally include, using power levels for the transmit signal below an upper threshold of interference and above a lower threshold to provide a dynamic range for measuring the frequency response of the RF front end circuitry, setting a power level for the transmit signal to not disturb the receiver performance of a handset located within one meter of the RF front-end circuitry and limiting the maximum RF power level according to an adjacent channel selectivity performance for a worst case scenario for 20 MHz bandwidth when only adjacent channels are used.

In Example 5 the subject matter of any one or more of Examples 1-4 may optionally include, transmitting a transmit signal with a detected received power level greater than or equal to −106 dBm and having a minimum RF output power adjusted dynamically between −40 dBm and 23 dBm.

In Example 6 the subject matter of any one or more of Examples 1-5 may optionally include, adjusting inter-stage transmit and receive filters and filter and antenna combinations, and tuning the RF front-end circuitry to a selected attenuation of transmit noise in the receive band to provide a selected sensitivity.

In Example 7 the subject matter of any one or more of Examples 1-6 may optionally include, monitoring the frequency response for a change, tuning component settings based on the monitored change of the frequency response and repeating the monitoring the change of the frequency response and tuning the component settings when the frequency response changes or when a transmit channel changes.

In Example 8 the subject matter of any one or more of Examples 1-7 may optionally include, optimizing the RF front-end circuitry for a selected low insertion loss by moving a frequency domain of the RF front-end circuitry away from a pass band, adapting filters in the RF front-end circuitry to suppress detected and selected unwanted interference and to suppress de-sensitization caused by unwanted interference and tuning a frequency response of the RF front-end circuitry during vacant time slots when the RF front-end circuitry is operating in a time division duplex (TDD) or a time division multiple access (TDMA) mode.

In Example 9 the subject matter of any one or more of Examples 1-8 may optionally include, bypassing a transmit inter-stage filter or tuning the inter-stage filter for pass band in the receive band while measuring and tuning the transmit antenna in the receive band.

In Example 10 the subject matter of any one or more of Examples 1-9 may optionally include, locating a notch in the frequency domain and tuning a receive filter accordingly.

In Example 11 the subject matter of any one or more of Examples 1-10 may optionally include, tuning of any band stop receive filter responses in the frequency domain and tuning a receive filter accordingly.

In Example 12 the subject matter of any one or more of Examples 1-11 may optionally include, directly connecting the receive antenna and the transmit antenna together to increase dynamic range for the measurement, wherein the adjusting the RF front-end circuitry to a selected frequency response using the determined information comprises tuning the transmit and receive inter-stage filters until the pass band of the filters tracks the frequency of the transmit signal when determining the frequency response of the first receive filter, the receive antenna and the transmit antenna.

In Example 13 the subject matter of any one or more of Examples 1-12 may optionally include, applying production tuning processes to inter-stage filters in the receive and transmit chain, providing scalar RF network analyzer functionality into the RF front-end circuitry between a receive antenna and a transmit antennas, reverting to appropriate settings for operation of the RF front-end circuitry by activating explicit coupling elements or de-activating shielding and filtering elements between a transmit antenna and a receive antenna and setting an update rate to a rate selected for coping with user intervention.

Example 14 may include subject matter (such as a device, apparatus, client or system) including an RF front-end circuitry and a processor, coupled to the RF front-end circuitry, the processor to adaptively tune the RF front-end circuitry is configured to sweep an RF frequency of a transmit signal of the RF front-end circuitry in at least a part of an RF transmit band and receive band, detect RF power in a receiver as a function of the RF frequency of the transmit signal to determine frequency characteristic of the transmit signal, determine information from a detected RF power as a function of the RF frequency of the transmit signal and adjust the RF front-end circuitry to a selected frequency response using the determined information.

In Example 15 the subject matter of Example 12 may optionally include, wherein the processor sweeps the frequency of the transmit signal of the front-end circuitry in a spectrum adjacent to the transmit band when the transmit signal is isolated at the input of the receiver, and uses information in the transmit signal of a transmitter of the RF front-end circuitry to identify that the RF energy detected at a receiver of the RF front-end circuitry originates from the transmitter of the RF front-end circuitry.

In Example 16 the subject matter of any one or more of Examples 14-15 may optionally include, wherein the processor sweeps the frequency of the transmit signal of the front-end circuitry during a production test pre-tuning when no hand and head of a user is present.

In Example 17 the subject matter of any one or more of Examples 14-16 may optionally include, wherein the processor sweeps the frequency of a transmit signal of front-end circuitry using power levels for the transmit signal below an upper threshold of interference and above a lower threshold to provide a dynamic range for measuring the frequency response of the RF front end circuitry.

In Example 18 the subject matter of any one or more of Examples 14-17 may optionally include, wherein the processor sweeps the frequency of a transmit signal of the RF front-end circuitry by transmitting a transmit signal with a detected received power level greater than or equal to −106 dBm, wherein the transmit signal has a minimum RF output power adjusted dynamically between −40 dBm and 23 dBm.

In Example 19 the subject matter of any one or more of Examples 14-18 may optionally include, wherein the processor adjusts the RF front-end circuitry by adjusting inter-stage transmit and receive filters and filter and antenna combinations and by tuning the RF front-end circuitry to a selected attenuation of transmit noise in the receive band to provide a selected sensitivity.

In Example 20 the subject matter of any one or more of Examples 14-19 may optionally include, wherein the processor adjusts the RF front-end circuitry to a selected frequency response using the determined information by monitoring the frequency response for a change, by tuning component settings based on the monitored change of the frequency response, and by repeating the monitoring the change of the frequency response and tuning the component settings when the frequency response changes or when a transmit channel changes.

In Example 21 the subject matter of any one or more of Examples 14-20 may optionally include, wherein the processor adjusts the RF front-end circuitry to a selected frequency response using the determined information by optimizing the RF front-end circuitry for a selected low insertion loss to move a frequency domain of the RF front-end circuitry away from a pass band, by adapting filters in the RF front-end circuitry to suppress unwanted interference and to suppress de-sensitization caused by unwanted interference and by tuning a frequency response of the RF front-end circuitry during vacant time slots when the RF front-end circuitry is operating in a time division duplex (TDD) or a time division multiple access (TDMA) mode.

In Example 22 the subject matter of any one or more of Examples 14-21 may optionally include, wherein the processor adjusts the RF front-end circuitry to a selected frequency response using the determined information by bypassing a transmit inter-stage filter or tuning the inter-stage filter for pass band in the receive band while measuring and tuning the transmit antenna in the receive band, and by locating notch or tuning of any band stop receive filter responses in the frequency domain and tuning a receive filter accordingly.

In Example 23 the subject matter of any one or more of Examples 14-22 may optionally include, wherein the processor adjusts the RF front-end circuitry to a selected frequency response using the determined information by locating notch in the frequency domain and tuning a receive filter accordingly.

In Example 24 the subject matter of any one or more of Examples 14-23 may optionally include, wherein the processor adjusts the RF front-end circuitry to a selected frequency response using the determined information by tuning of any band stop receive filter responses in the frequency domain and tuning a receive filter accordingly.

In Example 25 the subject matter of any one or more of Examples 14-24 may optionally include, wherein the processor is further configured to directly connect the receive antenna and the transmit antenna together to increase dynamic range for the measurement, wherein the processor adjusts the RF front-end circuitry to a selected frequency response using the determined information by tuning the transmit and receive inter-stage filters until the pass band of the filters tracks the frequency of the transmit signal when determining the frequency response of the first receive filter, the receive antenna and the transmit antenna.

In Example 26 the subject matter of any one or more of Examples 14-25 may optionally include, wherein the processor is further configured to apply production tuning processes to inter-stage filters in the receive and transmit chain, to provide scalar RF network analyzer functionality into the RF front-end circuitry between a receive antenna and a transmit antenna, to revert to appropriate settings for operation of the RF front-end circuitry by activating explicit coupling elements or de-activating shielding and filtering elements between a transmit antenna and a receive antenna and to set an update rate to a selected rate for coping with user intervention.

Example 27 may include subject matter such as means for performing acts or machine readable medium including instructions that, when executed by the machine, cause the machine to perform acts) including sweeping an RF frequency of a transmit signal of the RF front-end circuitry in at least a part of an RF transmit band and receive band, detecting RF power in a receiver as a function of the RF frequency of the transmit signal to determine a frequency characteristic of the transmit signal, determining information from a detected RF power as a function of the RF frequency of the transmit signal and adjusting the RF front-end circuitry to a selected frequency response using the determined information.

In Example 28 the subject matter of Example 27 may optionally include, sweeping the frequency of the transmit signal in a spectrum adjacent to the transmit band when the transmit signal is isolated at an input of a receive antenna and using information in the transmit signal of a transmitter of the RF front-end circuitry to identify that an RF energy detected at a receiver of the RF front-end circuitry originates from the transmitter of the RF front-end circuitry.

In Example 29 the subject matter of any one or more of Examples 27-28 may optionally include, sweeping the frequency of the transmit signal of the RF front-end circuitry during a production test pre-tuning when no hand and head of a user is present.

In Example 30 the subject matter of any one or more of Examples 27-29 may optionally include, using power levels for the transmit signal below an upper threshold of interference and above a lower threshold to provide a dynamic range for measuring the frequency response of the RF front end circuitry.

In Example 31 the subject matter of any one or more of Examples 27-30 may optionally include, transmitting a transmit signal with a detected received power level greater than or equal to −106 dBm and having a minimum RF output power adjusted dynamically between −40 dBm and 23 dBm.

In Example 32 the subject matter of any one or more of Examples 27-31 may optionally include, adjusting inter-stage transmit and receive filters and filter and antenna combinations, and tuning the RF front-end circuitry to a selected attenuation of transmit noise in a receive band to provide a selected sensitivity.

In Example 33 the subject matter of any one or more of Examples 27-32 may optionally include, monitoring the frequency response for a change, tuning component settings based on the monitored change of the frequency response and repeating the monitoring the change of the frequency response and tuning the component settings when the frequency response changes or when a transmit channel changes.

In Example 34 the subject matter of any one or more of Examples 27-33 may optionally include, optimizing the RF front-end circuitry for a selected low insertion loss by moving a frequency domain of the RF front-end circuitry away from a pass band, adapting filters in the RF front-end circuitry to suppress detected and selected unwanted interference and to suppress de-sensitization caused by unwanted interference and tuning a frequency response of the RF front-end circuitry during vacant time slots when the RF front-end circuitry is operating in a time division duplex (TDD) or a time division multiple access (TDMA) mode.

In Example 35 the subject matter of any one or more of Examples 27-34 may optionally include, bypassing a transmit inter-stage filter or tuning the inter-stage filter for pass band in a receive band while measuring and tuning the transmit antenna in the receive band and locating notch or tuning of any band stop receive filter responses in the frequency domain and tuning a receive filter accordingly.

In Example 36 the subject matter of any one or more of Examples 27-35 may optionally include, locating notch in the frequency domain and tuning a receive filter accordingly.

In Example 37 the subject matter of any one or more of Examples 27-36 may optionally include, tuning of any band stop receive filter responses in the frequency domain and tuning a receive filter accordingly.

In Example 38 the subject matter of any one or more of Examples 27-37 may optionally include, directly connecting a receive antenna and a transmit antenna together to increase dynamic range for a measurement, wherein the adjusting the RF front-end circuitry to a selected frequency response using the determined information comprises tuning the transmit and receive inter-stage filters until a pass band of the filters tracks the frequency of the transmit signal when determining the frequency response of a first receive filter, the receive antenna and the transmit antenna.

In Example 39 the subject matter of any one or more of Examples 27-38 may optionally include, applying production tuning processes to inter-stage filters in the receive and transmit chain, providing scalar RF network analyzer functionality into the RF front-end circuitry between a receive antenna and a transmit antennas, reverting to appropriate settings for operation of the RF front-end circuitry by activating explicit coupling elements or de-activating shielding and filtering elements between a transmit antenna and a receive antenna and setting an update rate to a rate selected for coping with user intervention.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc, are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because examples may include a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A method for adaptively tuning a radio frequency (RF) device comprising RF front-end circuitry, the method comprising:
   sweeping an RF frequency of a transmit signal over multiple frequencies in at least a part of an RF transmit band and in at least a part of a receive band;
   during the sweeping, detecting RF power in a receiver as a function of the multiple RF frequencies of the transmit signal;
   determining information from the detected RF power as a function of the multiple RF frequencies of the transmit signal; and
   adjusting the RF front-end circuitry to a selected frequency response using the information after the sweeping has been completed and the information has been determined,
   wherein the adjusting the RF front-end circuit comprises tuning a frequency response of the RE front-end circuitry during vacant time slots when the RF front-end circuitry is operating in a time division duplex (TDD) or a time division multiple access (TDMA) mode.

2. The method of claim 1, wherein the sweeping the multiple RF frequencies of the transmit signal comprises:
   sweeping the multiple RF frequencies of the transmit signal in a spectrum adjacent to the transmit band when the transmit signal is isolated at an input of a receive antenna; and
   using information in the transmit signal of a transmitter of the RF front-end circuitry to identify that RF energy detected at a receiver of the RF front-end circuitry originates from the transmitter of the RF front-end circuitry.

3. The method of claim 1, further comprising:
   setting a default RF front-end tuning when no frequency characteristic change of the transmit signal is detected during the sweeping.

4. The method of claim 1, wherein the sweeping the multiple RF frequencies of a transmit signal comprises:
   using power levels for the transmit signal below an upper threshold of interference and above a lower threshold to provide a dynamic range for measuring a frequency response of the RF front end circuitry.

5. The method of claim 1, wherein the transmit signal is supplied by a transmit antenna and the RF power detected by a receive antenna isolated from the transmit antenna to determine a location of at least one tunable notch or other band stop element in a frequency domain.

6. The method of claim 1, wherein the adjusting the RF front-end circuitry further comprises:
   adjusting inter-stage transmit and receive filters and filter and antenna combinations, and
   tuning the RF front-end circuitry to a selected attenuation of transmit noise in a receive band to provide a selected sensitivity.

7. The method of claim 1, wherein the adjusting the RF front-end circuitry to a selected frequency response using the information further comprises:
   monitoring the frequency response for a change;
   tuning component settings based on the monitored change of the frequency response; and
   repeating the monitoring the change of the frequency response and tuning the component settings when the frequency response changes or when a transmit channel changes.

8. The method of claim 1, wherein the adjusting the RF front-end circuitry to a selected frequency response using the information further comprises:
   optimizing the RF front-end circuitry for a selected low insertion loss by moving a frequency domain of the RF front-end circuitry away from a pass band; and
   adapting filters in the RF front-end circuitry to suppress detected and selected unwanted interference and to suppress de-sensitization caused by unwanted interference.

9. The method of claim 1, wherein the adjusting the RF front-end circuitry to a selected frequency response using the information further comprises:
   bypassing a transmit inter-stage filter or tuning the inter-stage filter for a pass band in the receive band while measuring and tuning the transmit antenna in the receive band.

10. The method of claim 1, wherein the adjusting the RF front-end circuitry to a selected frequency response using the information further comprises:
    locating a notch in a frequency domain and tuning a receive filter accordingly.

11. The method of claim 1, wherein the adjusting the RF front-end circuitry to a selected frequency response using the information further comprises:
   tuning band stop receive filter responses in the frequency domain and tuning a receive filter accordingly.

12. The method of claim 1 further comprising:
   directly connecting a receive antenna and a transmit antenna together to increase dynamic range for a measurement, wherein the adjusting the RF front-end circuitry to a selected frequency response using the information comprises tuning transmit and receive inter-stage filters until a pass band of the transmit and receive inter-stage filters tracks the RF frequency of the transmit signal when determining a frequency response of a first receive filter, the receive antenna and the transmit antenna.

13. The method of claim 1 wherein:
   the information comprises at least one of modulation, encoded or encrypted information.

14. The method of claim 1 wherein:
   at least one of a receive filter or an antenna element are tuned by sweeping transmit and receive part of the transmit band and the receive band as well as spectrum adjacent to the transmit band and receive band.

15. A method for adaptively tuning a radio frequency (RF) device comprising RF front-end circuitry, the method comprising:
   sweeping an RF frequency of a transmit signal over multiple frequencies in at least a part of an RF transmit band and in at least a part of a receive band;
   during the sweeping detecting RF power in a receiver as a function of the multiple RF frequencies of the transmit signal;
   determining information from the detected RF power as a function of the multiple RF frequencies of the transmit signal;
   adjusting the RF front-end circuitry to a selected frequency response using the information after the sweeping has been completed and the information has been determined;
   applying production tuning processes to inter-stage filters in a receive and transmit chain, providing scalar RF network analyzer functionality into the RF front-end circuitry between a receive antenna and a transmit antenna;
   reverting to appropriate settings for operation of the RF front-end circuitry by activating explicit coupling elements or de-activating shielding and filtering elements between the transmit antenna and the receive antenna; and
   setting an update rate to a rate selected for coping with user intervention.

16. An apparatus of a mobile communications device, the apparatus comprising:
   a processor to adaptively tune radio frequency (RF) front-end circuitry, configured to:
      sweep a transmit signal over multiple RF frequencies in at least a part of an RF transmit band and in at least a part of a receive band;
      during the sweep, detect RF power in a receiver as a function of the multiple RF frequencies of the transmit signal;
      determine information from the detected RF power as a function of the multiple RF frequencies of the transmit signal;
      adjust the RF front-end circuitry to a selected frequency response using the information after the sweeping has been completed and the information has been determined; and
      sweep the multiple RF frequencies of the transmit signal in a spectrum adjacent to a transmit band when the transmit signal is isolated at an input of a receive antenna, and use information in the transmit signal of a transmitter of the RF front-end circuitry to identify that RF energy detected at a receiver of the RF front-end circuitry originates from the transmitter of the RF front-end circuitry.

17. The mobile communications device of claim 16, wherein the processor is configured to set a default RF front-end tuning when no frequency characteristic change of the transmit signal is detected during the sweep.

18. The mobile communications device of claim 16, wherein the processor is configured to sweep the multiple RF frequencies of the transmit signal using power levels for the transmit signal below an upper threshold of interference and above a lower threshold to provide a dynamic range for measuring a frequency response of the RF front-end circuitry.

19. The mobile communications device of claim 16, wherein the transmit signal is supplied by a transmit antenna and the RF power detected by a receive antenna isolated from the transmit antenna to determine a location of at least one tunable notch or other band stop element in a frequency domain.

20. The mobile communications device of claim 16, wherein the processor is configured to adjust the RF front-end circuitry by adjusting inter-stage transmit and receive filters and filter and antenna combinations and by tuning the RF front-end circuitry to a selected attenuation of transmit noise in a receive band to provide a selected sensitivity.

21. The mobile communications device of claim 16, wherein the processor is configured to adjust the RF front-end circuitry to a selected frequency response using the information by monitoring the frequency response for a change, by tuning component settings based on the monitored change of the frequency response, and by repeating the monitoring the change of the frequency response and tuning the component settings when the frequency response changes or when a transmit channel changes.

22. The mobile communications device of claim 16, wherein the processor is configured to adjust the RF front-end circuitry to a selected frequency response using the information by optimizing the RF front-end circuitry for a selected low insertion loss to move a frequency domain of the RF front-end circuitry away from a pass band, by adapting filters in the RF front-end circuitry to suppress unwanted interference and to suppress de-sensitization caused by unwanted interference and by tuning a frequency response of the RF front-end circuitry during vacant time slots when the RF front-end circuitry is operating in a time division duplex (TDD) or a time division multiple access (TDMA) mode.

23. The mobile communications device of claim 16, wherein the processor is configured to adjust the RF front-end circuitry to a selected frequency response using the information by bypassing a transmit inter-stage filter or tuning the inter-stage filter for a pass band in the receive band while measuring and tuning a transmit antenna in the receive band.

24. The mobile communications device of claim 16, wherein the processor is configured to adjust the RF front-end circuitry to a selected frequency response using the information by locating a notch in a frequency domain and tuning a receive filter accordingly.

25. The mobile communications device of claim 16, wherein the processor is configured to adjust the RF front-end circuitry to a selected frequency response using the information by tuning band stop receive filter responses in the frequency domain and tuning a receive filter accordingly.

26. The mobile communications device of claim 16, wherein the processor is further configured to directly connect a receive antenna and a transmit antenna together to increase dynamic range for a measurement, wherein the processor is configured to adjust the RF front-end circuitry to a selected frequency response using the information by tuning transmit and receive inter-stage filters until a pass band of the transmit and receive inter-stage filters tracks a frequency of the transmit signal when determining the frequency response of a first receive filter, the receive antenna and the transmit antenna.

27. The mobile communications device of claim 16, wherein the processor is further configured to apply production tuning processes to inter-stage filters in a receive and transmit chain, to provide scalar RF network analyzer functionality into the RF front-end circuitry between a receive antenna and a transmit antenna, to revert to appropriate settings for operation of the RF front-end circuitry by activating explicit coupling elements or de-activating shielding and filtering elements between the transmit antenna and the receive antenna and to set an update rate to a selected rate for coping with user intervention.

28. At least one non-transitory machine readable medium comprising instructions that, when executed by the machine, cause the machine to perform operations for adaptively tuning a radio frequency (RF) device comprising RF front-end circuitry, the operations comprising:
  sweeping a transmit signal over multiple RF frequencies in at least a part of an RF transmit band and in at least a part of a receive band;
  during the sweeping, detecting RF power in a receiver as a function of the multiple RF frequencies of the transmit signal;
  determining information from the detected RF power as a function of the multiple RF frequencies of the transmit signal; and
  adjusting the RF front-end circuitry to a selected frequency response using the information after the sweeping has been completed and the information has been determined,
  wherein the sweeping the multiple RF frequencies of the transmit signal comprises sweeping the multiple RF frequencies of the transmit signal in a spectrum adjacent to the transmit band when the transmit signal is isolated at an input of a receive antenna, and using information in the transmit signal of a transmitter of the RF front-end circuitry to identify that RF energy detected at a receiver of the RF front-end circuitry originates from the transmitter of the RF front-end circuitry.

29. The at least one non-transitory machine readable medium of claim 28, wherein adjusting the RF front-end circuitry comprises one of:
  adjusting inter-stage transmit and receive filters and filter and antenna combinations, and tuning the RF front-end circuitry to a selected attenuation of transmit noise in a receive band to provide a selected sensitivity; or
  monitoring the frequency response for a change, changing tuning of component settings based on the monitored change of the frequency response and repeating the monitoring the change of the frequency response and tuning the component settings when the frequency response changes or when a transmit channel changes;
  wherein the changing the tuning of component settings includes performing at least one of:
    optimizing the RF front-end circuitry for a selected low insertion loss by moving a frequency domain of the RF front-end circuitry away from a pass band;
    adapting filters in the RF front-end circuitry to suppress detected and selected unwanted interference and to suppress de-sensitization caused by unwanted interference;
    tuning a frequency response of the RF front-end circuitry during vacant time slots when the RF front-end circuitry is operating in a time division duplex (TDD) or a time division multiple access (TDMA) mode;
    bypassing a transmit inter-stage filter or tuning the inter-stage filter for a pass band in the receive band while measuring and tuning a transmit antenna in the receive band;
    locating a notch in the frequency domain and tuning a receive filter accordingly; and
    tuning band stop receive filter responses in the frequency domain and tuning the receive filter accordingly.

30. A method for adaptively tuning a radio frequency (RF) device comprising RF front-end circuitry, the method comprising:
  sweeping an RF frequency of a transmit signal over multiple frequencies in at least a part of an RF transmit band and in at least a part of a receive band;
  during the sweeping, detecting RF power in a receiver as a function of the multiple RF frequencies of the transmit signal;
  determining information from the detected RF power as a function of the multiple RF frequencies of the transmit signal;
  adjusting the RF front-end circuitry to a selected frequency response using the information after the sweeping has been completed and the information has been determined; and
  one of deactivating or moving in a frequency domain band stop elements that provide transmit isolation to improve insertion loss in response to the RF device entering idle mode, a time division duplex (TDD) mode or a time division multiple access (TDMA) mode.

* * * * *

UNITED STATES PATENT AND TRADEMARK OFFICE
CERTIFICATE OF CORRECTION

PATENT NO. : 9,793,983 B2  
APPLICATION NO. : 15/190747  
DATED : October 17, 2017  
INVENTOR(S) : Olesen et al.

Page 1 of 1

It is certified that error appears in the above-identified patent and that said Letters Patent is hereby corrected as shown below:

In the Claims

In Column 17, Line 65, in Claim 1, delete "circuit" and insert --circuitry-- therefor In Column 17, Line 66, in Claim 1, delete "RE" and insert --RF-- therefor In Column 19, Line 33, in Claim 15, delete "sweeping" and insert --sweeping,-- therefor Signed and Sealed this
Twenty-eighth Day of April, 2020

Andrei Iancu
*Director of the United States Patent and Trademark Office*